US011735220B2

United States Patent
Wu et al.

(10) Patent No.: US 11,735,220 B2
(45) Date of Patent: Aug. 22, 2023

(54) PHASE LOCKING MULTIPLE CLOCKS OF DIFFERENT FREQUENCIES

(71) Applicant: Seagate Technology LLC, Fremont, CA (US)

(72) Inventors: Zheng Wu, Los Altos, CA (US); Jason Bellorado, San Jose, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/562,426

(22) Filed: Dec. 27, 2021

(65) Prior Publication Data

US 2023/0206951 A1    Jun. 29, 2023

(51) Int. Cl.
*G11B 20/10* (2006.01)
*G11B 5/596* (2006.01)
*G11B 11/105* (2006.01)

(52) U.S. Cl.
CPC .... *G11B 11/10578* (2013.01); *G11B 5/59655* (2013.01)

(58) Field of Classification Search
CPC ... G11B 5/54; G11B 5/59633; G11B 5/59638; G11B 5/52; G11B 15/005; G11B 5/09; G11B 20/10; G11B 20/10212; G11B 20/10222; G11B 5/59616; G11B 5/012; G11B 20/08; G11B 20/10009; G11B 20/10027; G11B 5/035
USPC .............................................. 360/75, 48, 51
See application file for complete search history.

(56) References Cited

U.S. PATENT DOCUMENTS

| | | |
|---|---|---|
| 5,461,644 A | 10/1995 | Bermans et al. |
| 5,500,776 A | 3/1996 | Smith |
| 5,621,769 A | 4/1997 | Wan et al. |
| 5,862,192 A | 1/1999 | Huszar et al. |
| 6,111,712 A | 8/2000 | Vishakhadatta et al. |
| 6,181,213 B1 | 1/2001 | Chang |
| 6,396,887 B1 | 5/2002 | Ware et al. |
| 6,438,185 B1 | 8/2002 | Huttunen |
| 6,493,176 B1 | 12/2002 | Deng et al. |
| 6,519,107 B1 | 2/2003 | Ehrlich et al. |
| 6,549,587 B1 | 4/2003 | Li |

(Continued)

OTHER PUBLICATIONS

Guo, Yuanbin , "An Efficient Circulant MIMO Equalizer for CDMA Downlink: Algorithm and VLSI Architecture", Hindawi Publishing Corporation, Jan. 1, 2006 00:00:00.0, pp. 1-18.

(Continued)

*Primary Examiner* — Nabil Z Hindi
(74) *Attorney, Agent, or Firm* — Christian W. Best

(57) ABSTRACT

Systems and methods are disclosed for phase locking of a clock. In some embodiments, a phase locked clock (PLC) module can phase-lock a write clock to a media written with multiple servo zones of different frequencies. In some implementations, this can be utilized to perform a self-servo write (SSW) of a disc surface within a hard disc drive (HDD). A PLC module can perform a method of writing with a single frequency phase coherently while a read element passes over servo zones with different frequencies. While the PLC module can perform such methods for a SSW process, the methods can also be utilized for other applications that can benefit from writing with a single frequency phase coherently based on servo zones with different frequencies.

20 Claims, 6 Drawing Sheets

(56) References Cited

U.S. PATENT DOCUMENTS

| | | |
|---|---|---|
| 6,581,182 B1 | 6/2003 | Lee |
| 6,831,803 B2 | 12/2004 | Hsin |
| 6,847,503 B2 | 1/2005 | Zhang et al. |
| 6,956,711 B2 | 10/2005 | Hanson et al. |
| 6,975,480 B1 | 12/2005 | Codilian et al. |
| 6,977,792 B1 | 12/2005 | Melrose et al. |
| 7,027,253 B1 | 4/2006 | Sun et al. |
| 7,027,256 B1 | 4/2006 | Subrahmanyam et al. |
| 7,085,330 B1 | 8/2006 | Shirali |
| 7,088,532 B1 | 8/2006 | Krajnovich et al. |
| 7,088,533 B1 | 8/2006 | Shepherd et al. |
| 7,106,542 B1 | 9/2006 | Sun et al. |
| 7,119,981 B2 | 10/2006 | Hanson et al. |
| 7,133,239 B1 | 11/2006 | Hartman et al. |
| 7,149,044 B1 | 12/2006 | Chen et al. |
| 7,154,689 B1 | 12/2006 | Shepherd et al. |
| 7,161,759 B1 | 1/2007 | Zhang et al. |
| 7,196,864 B1 | 3/2007 | Yi et al. |
| 7,212,369 B1 | 5/2007 | Levy et al. |
| 7,230,789 B1 | 6/2007 | Brunnett et al. |
| 7,233,455 B1 | 6/2007 | Rewerts et al. |
| 7,248,427 B1 | 7/2007 | Everett et al. |
| 7,330,331 B2 | 2/2008 | Zhang |
| 7,355,808 B1 | 4/2008 | Tung et al. |
| 7,375,918 B1 | 5/2008 | Shepherd et al. |
| 7,440,208 B1 | 10/2008 | McEwen et al. |
| 7,440,224 B2 | 10/2008 | Ehrlich et al. |
| 7,474,491 B2 | 1/2009 | Liikanen et al. |
| 7,489,469 B2 | 2/2009 | Sun et al. |
| 7,542,230 B1 | 6/2009 | Melrose et al. |
| 7,561,359 B1 | 7/2009 | Jeong et al. |
| 7,589,930 B2 | 9/2009 | Hanson et al. |
| 7,595,954 B1 | 9/2009 | Chen et al. |
| 7,787,209 B1 | 8/2010 | Liikanen et al. |
| 8,027,117 B1* | 9/2011 | Sutardja ............ G11B 20/10222 360/75 |
| 8,139,301 B1 | 3/2012 | Li et al. |
| 8,160,181 B1 | 4/2012 | Song et al. |
| 8,296,637 B1 | 10/2012 | Varnica et al. |
| 8,508,879 B1 | 8/2013 | Zou et al. |
| 8,543,894 B1 | 9/2013 | Varnica et al. |
| 8,643,976 B1 | 2/2014 | Wang et al. |
| 8,670,206 B1 | 3/2014 | Liang et al. |
| 8,887,033 B1 | 11/2014 | Varnica et al. |
| 8,953,276 B1 | 2/2015 | Pokharel et al. |
| 9,019,642 B1 | 4/2015 | Xia et al. |
| 9,093,097 B1 | 7/2015 | Lee et al. |
| 9,099,132 B1 | 8/2015 | Grundvig et al. |
| 9,142,246 B1 | 9/2015 | Trantham et al. |
| 9,189,315 B1 | 11/2015 | Varnica et al. |
| 9,245,578 B1 | 1/2016 | Wang et al. |
| 9,246,668 B1 | 1/2016 | Yu et al. |
| 9,311,959 B1 | 4/2016 | Fan et al. |
| 9,361,919 B1 | 6/2016 | Lieu et al. |
| 9,385,757 B1 | 7/2016 | Nangare |
| 9,489,976 B2 | 11/2016 | Jury et al. |
| 9,536,563 B1 | 1/2017 | Liu et al. |
| 9,645,763 B2 | 5/2017 | Sankaranarayanan et al. |
| 9,998,136 B1 | 6/2018 | Wu |
| 10,014,026 B1 | 7/2018 | Wu et al. |
| 10,049,692 B1 | 8/2018 | Liu et al. |
| 10,164,760 B1 | 12/2018 | Bellorado et al. |
| 10,177,771 B1 | 1/2019 | Bellorado et al. |
| 10,180,868 B2 | 1/2019 | Alhussien et al. |
| 10,276,233 B1 | 4/2019 | Dan et al. |
| 10,297,281 B1 | 5/2019 | Bellorado et al. |
| 10,469,290 B1 | 11/2019 | Marrow et al. |
| 10,498,565 B1 | 12/2019 | Azenkot et al. |
| 10,936,003 B1* | 3/2021 | Wu ............................ G06F 1/08 |
| 11,074,933 B1 | 7/2021 | Mendonsa et al. |
| 2002/0080898 A1 | 6/2002 | Agazzi et al. |
| 2003/0185114 A1 | 10/2003 | Liaw |
| 2003/0198152 A1 | 10/2003 | Morishima |
| 2004/0101068 A1 | 5/2004 | Wang et al. |
| 2004/0268033 A1 | 12/2004 | Chia et al. |
| 2005/0270687 A1 | 12/2005 | Zweighaft |
| 2006/0214708 A1 | 9/2006 | Huang et al. |
| 2006/0215290 A1 | 9/2006 | Kurtas et al. |
| 2008/0007855 A1 | 1/2008 | Vityaev et al. |
| 2009/0028252 A1 | 1/2009 | Lu |
| 2009/0097606 A1 | 4/2009 | Hutchins et al. |
| 2009/0147402 A1 | 6/2009 | Sul et al. |
| 2009/0262870 A1 | 10/2009 | Ashbrook et al. |
| 2010/0265614 A1 | 10/2010 | Kim et al. |
| 2011/0072335 A1 | 3/2011 | Liu et al. |
| 2012/0082018 A1 | 4/2012 | Gushima et al. |
| 2013/0201838 A1 | 8/2013 | Homchaudhuri et al. |
| 2014/0009192 A1 | 1/2014 | Suzuki |
| 2014/0035638 A1 | 2/2014 | Bode |
| 2014/0223114 A1 | 8/2014 | Wang et al. |
| 2015/0022916 A1 | 1/2015 | Zou et al. |
| 2015/0355838 A1 | 12/2015 | Chen et al. |
| 2015/0380048 A1 | 12/2015 | Oberg et al. |
| 2016/0019921 A1 | 1/2016 | Bui et al. |
| 2016/0164532 A1 | 6/2016 | Zhang et al. |
| 2016/0293205 A1 | 10/2016 | Jury et al. |
| 2016/0351227 A1 | 12/2016 | Koshino |
| 2017/0125089 A1 | 5/2017 | Sankaranarayanan et al. |
| 2017/0125110 A1 | 5/2017 | Sankaranarayanan et al. |
| 2017/0236592 A1 | 8/2017 | Alhussien et al. |
| 2017/0249206 A1 | 8/2017 | Jeong et al. |
| 2018/0011753 A1 | 1/2018 | Alhussien et al. |
| 2018/0012663 A1 | 1/2018 | Alhussien et al. |
| 2018/0277158 A1 | 9/2018 | Kishino |
| 2018/0367164 A1 | 12/2018 | Marrow et al. |
| 2019/0130967 A1 | 5/2019 | Danjean et al. |
| 2020/0065262 A1 | 2/2020 | Bellorado |

OTHER PUBLICATIONS

Hicks, James, "Overloaded Array Processing with Spatially Reduced Search Joint Detection", Virginia Polytechnic Institute & State University, May 10, 2000 00:00:00.0, pp. 1-144.

Mohammad, Maruf, "Blind Acquisition of Short Burst with Per-Survivor Processing (PSP)", Virginia Polytechnic Institute & State University, Nov. 26, 2002 00:00:00.0, pp. 1-127.

Nechaev, Y. B., et al., "Increasing Efficiency of Information Transmission with Interference Influence by the Use of Multi-Parameter Adaptation", East-West Design & Test Symposium (EWDTS 2013), Rostov-on-Don, 2013, pp. 1-4 (Year: 2013).

* cited by examiner

PHASE LOCKING MULTIPLE CLOCKS OF DIFFERENT FREQUENCIES

SUMMARY

In certain embodiments, an apparatus may comprise a data channel including a phase lock clock (PLC) module configured to synchronize multiple servo clocks to a reference clock, and, after synchronization of the multiple servo clocks, perform a write to a first data storage medium utilizing a single frequency phase while a write head is positioned based on servo zones with different frequencies.

In certain embodiments, a circuit may comprise a write clock circuit configured to produce a write clock, a first servo channel circuit, a second servo channel circuit, a first servo clock circuit configured to produce a first read clock aligned to a first frequency and configured to be utilized by the first servo channel circuit to demodulate a first servo zone having the first frequency and generate first servo timing marks; a second servo clock circuit configured to produce a second read clock aligned to a second frequency and configured to be utilized by the second servo channel circuit to demodulate a second servo zone having the second frequency and generate second servo timing marks, and a disc locked clock (DLC) control circuit configured to maintain phase coherency based on the first servo timing marks and the second servo timing marks when switching from the first servo zone to the second servo zone. The circuit may be configured to synchronize the first servo clock and the second servo clock to the write clock, and, after synchronization of the first and second servo clocks, perform a write to a first data storage medium utilizing a single frequency phase while a write head is positioned based on both the first servo zone and the second servo zone.

In certain embodiments, a memory device storing instructions that when executed cause a processing circuit to perform a method comprising synchronizing, in a data channel, multiple servo clocks to a reference clock, and after synchronization of the multiple servo clocks, performing a write to a first data storage medium utilizing a single frequency phase while a write head is positioned based on servo zones with different frequencies.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits (ASIC), programmable logic arrays, system-on-chip (SoC), and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor or control system to perform a particular task or job, or may be any combination thereof. Further, the methods described herein may be implemented as a computer readable storage medium or memory device including instructions that, when executed, cause a processor to perform the methods.

Figure 1:
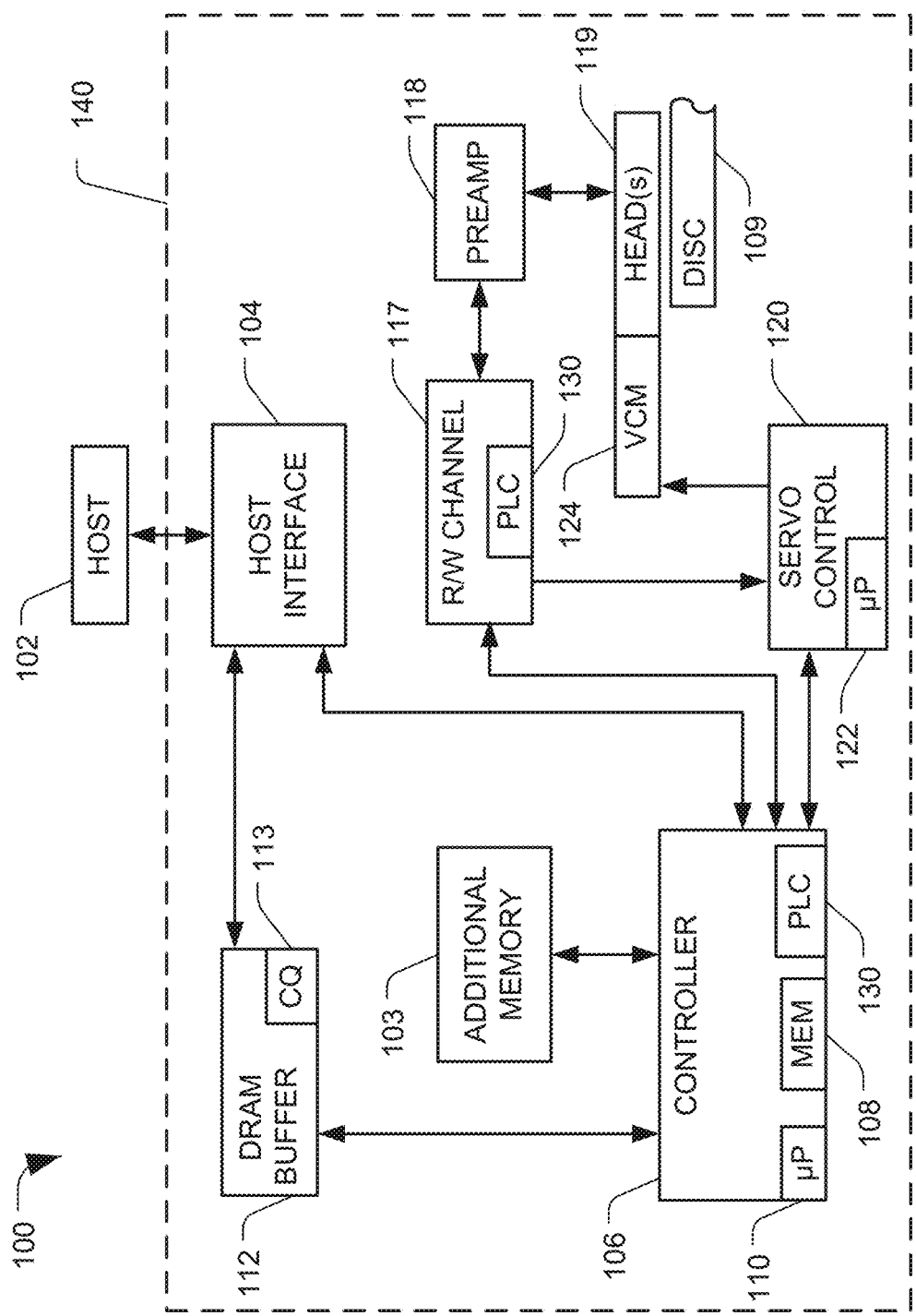
FIG. 1 is a diagram of a system configured to implement a phase locked clock, in accordance with certain embodiments of the present disclosure.

Referring to FIG. 1, a system 100 configured to implement a phase locked clock is shown, in accordance with certain embodiments of the present disclosure. System 100 can include a self-servo writing system 140, which in some embodiments may be a data storage device (DSD) such as a hard disc drive (HDD). The system 100 may communicate with a host device 102 (such as a server or personal computing device) via a hardware or firmware-based interface circuit 104. The interface 104 may comprise any interface that allows communication between a host 102 and the system 140, either wired or wireless. The interface 104 may include a connector (not shown) that allows the system 140 to be physically removed from the host 102. In some embodiments, the system 140 may have a casing housing the components of the system 140, or the components of the system 140 may be attached to the housing, or any combination thereof.

In some embodiments, such as a DSD, the buffer memory 112 can temporarily store data during read and write operations, and can include a command queue (CQ) 113 where multiple pending operations can be temporarily stored pending execution. Commands arriving over the interface 104 may be received in the CQ 113 or may be stored there by controller 106, interface 104, or another component. There may also be additional memory 103, which, for example, can be a volatile or nonvolatile solid-state memory.

The DSD 100 can include a programmable controller 106, which can include associated memory 108 and processor 110. The DSD 140 can include a read-write (R/W) data channel 117, which can encode data during write operations and reconstruct user (or host) data retrieved from a memory, such as disc(s) 109, during read operations. A preamplifier circuit (preamp) 118 can apply write currents to the head(s) 119 and provide pre-amplification of read-back signals. A servo control circuit 120 may use servo data to provide the appropriate current to the coil 124, sometimes called a voice coil motor (VCM), to position the head(s) 119 over a desired area of the disc(s) 109. The controller 106 can communicate with a processor 122 to move the head(s) 119 to the desired locations on the disc(s) 109 during execution of various pending commands, such as read or write commands in the command queue 113. The disc(s) 109 may each contain one or two surfaces that store data; for example, each top side of a disc and each bottom side of a disc can be used to store data.

During operation, the head(s) 119 of DSD 140 may be used to write data to and read data from the surface(s) of the disc(s) 109. The head(s) 119 may include both a write head element and a read head element. The write head can produce a magnetic field to write a signal to the disc 109 to facilitate storing data thereon. As the disc(s) 109 spin, the write head can store data in narrow concentric data tracks on the disc(s) 109, such as shown in FIGS. 7 and 9. The read head can read data from the disc(s) by generating a signal based on detected magnetic transitions stored to the disc(s) 109. The data channel 117 can estimate data based on the signal, which estimate may include one or more errors. Thus, the data channel 117 (or the controller 106) can include one or more modules to perform error detection and correction.

Further, the system 140 can utilize the head(s) 119 and servo system 120 to perform a self-servo writing (SSW) process to write servo patterns on a surface of the disc(s) 109 without using external servo writing equipment. In some examples of a spiral SSW process, some surfaces may be written with single zone servo patterns temporarily and later overwritten with different servo patterns, which may have different frequencies. However, such rewriting of the servo patterns can be costly because of the amount of time consumed in manufacturing because of writing the servo patterns multiple times.

A solution to this and other problems, as detailed herein, can include writing the final servo patterns the first time without writing any temporary servo patterns. This solution can be implemented by a phase locked clock (PLC) module 130 that can perform a method of writing with a single frequency phase coherently across servo zones with different frequencies. The PLC module 130 can phase-lock a clock to a media written with multiple servo zones of different frequencies. While the PLC module 130 can perform such methods for a SSW process, the methods can also be utilized for other applications that can benefit from writing with a single frequency phase coherently while a write head is guided based on servo zones with different frequencies.

Figure 2:
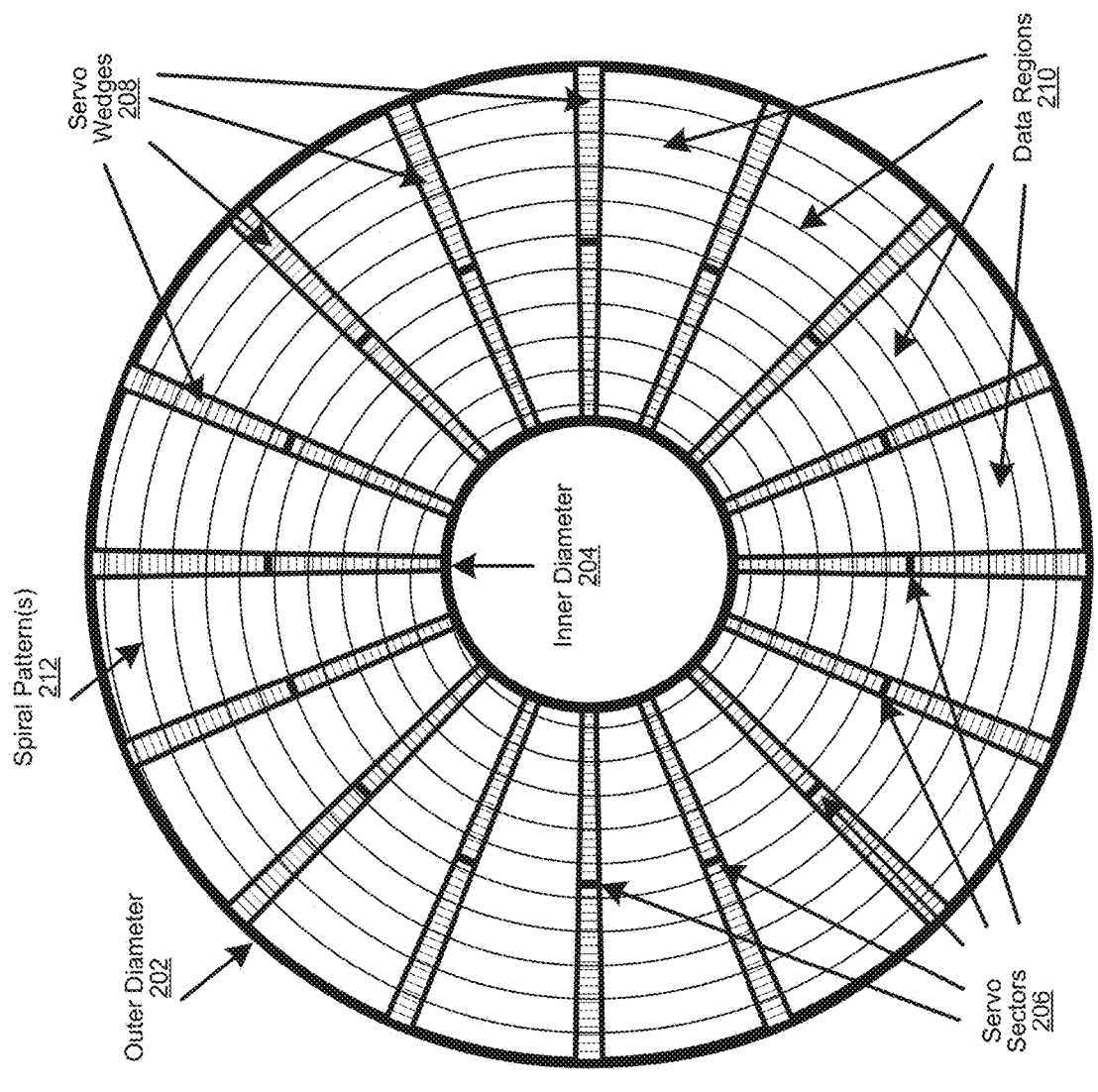
FIG. 2 is a diagram of a data storage medium for use in a system implementing a phase locked clock, in accordance with certain embodiments of the present disclosure.

FIG. 2 is a diagram of a data storage medium 200 for use in a system implementing a phase locked clock, in accordance with certain embodiments of the present disclosure. The system may include a surface of disc as an example data storage medium 200, such as the disc 109 of FIG. 1. FIG. 2 shows a single side, and thus a single surface, of a disc data storage medium 200, though, in some embodiments, a disc data storage medium 200 can have two data recording surfaces with one on each side of the disc. Further, a system, such as system 140 of FIG. 1, can implement multiple discs and have more than two surfaces in a single data storage device.

Data may be stored to a disc memory 200 along very narrow concentric bands called tracks (not shown). There may be hundreds of thousands of tracks on a single disc surface, and so a DSD may need to be extremely precise in positioning the head(s) over a correct track when performing operations. In order to know where the head(s) are currently located (e.g., over which track), a DSD may read servo positioning information stored to the disc, such as in servo sectors 206.

As stated, the disc 200 may be configured to record data (e.g., system data or user data) to a multitude of concentric circular data tracks (or just "tracks") arranged from an outer diameter 202 to an inner diameter 204 of the disc 200. The disc 200 may spin about a central spindle located at the inner diameter 204. A read or write head, such as head(s) 119 of FIG. 1, may be positioned above the surface of the disc 200, and can read or write data to the tracks while the disc 200 spins below the head. A disc surface may include previously written servo patterns, which a DSD may use to determine a head's positioning relative to tracks and the disc. The head(s) and data channel can detect these servo patterns to locate the data tracks where data can be read or written. Each data track may include portions devoted to data and portions reserved for the servo patterns. During a manufacturing process for a DSD, the servo patterns can be written to the disc 200 via a self-servo write (SSW) process.

The storage and subsequent retrieval of data from a disc surface 200 can be achieved by the demodulation of servo signals generated by a read element reading the servo patterns. As shown in FIG. 2, the servo pattern may consist of a multitude of radially oriented servo wedges 208 oriented from the inner diameter (ID) 204 to the outer diameter (OD) 202 and spaced evenly about the circumference of the disc 200. Each servo wedge 208 can include a plurality of servo sectors 206, arranged radially with one servo sector 206 nearest to the ID 204, the next servo sector 206 adjacent to that, and so on out to a last servo sector 206 nearest to the OD 202. The servo sectors 206 may define concentric circular tracks, where each track includes a multitude of servo sectors 206 written at an (approximately) equal radius and spaced uniformly around the disc (e.g., a track may be composed of all sectors with an equivalent track ID (TID)). An example track may be defined by the servo sectors 206 shaded black in FIG. 2, all at approximately the same radial distance from the center of the disc 200. Data can be stored to portions of the concentric data tracks in the data regions 210 located between each servo wedge 208. While the disc 200 spins below a read head, the head may follow the servo sectors 206 to attempt to remain centered over the corresponding track and read the data stored to the data regions 210. While following a track, a head may detect a recurrent sequence of a servo sector 206 followed by one or more data sectors within the data region 210, followed by another servo sector 206 and so on.

The data contained within each servo sector 206 may specify its physical radial and tangential locations. As a read element passes over each servo sector 206, the servo sector's information may be demodulated such that the position of the read head is always known to the hard-disc controller (the position of the write-head may also be inferred). Furthermore, the spacing between servo sectors 206 can be utilized to modulate the frequency of clocks used for all write and read operations such that the frequencies remain consistent relative to the rotational velocity of the disc 200. It is this processing of the servo pattern which allows for consistent writes and reliable reads from a disc drive. Although a simplified example is provided in FIG. 2, an actual disc 200 may have considerably more servo wedges 208 and servo sectors 206 than in the depicted embodiment. Accordingly, due to the density of data tracks and servo information stored to the disc 200, extremely precise positioning of the servo data may be important to the proper functioning of a DSD.

The writing procedure of the servo pattern can be performed by a dedicated machine known as a servowriter, disc writer, STW (servo track writer), MDW (multi-disc writer), or MDSW (multi-disc servo writer), where the servo patterns are written to the discs before the discs are assembled into the drive. A servowriter may be a very precise and expensive piece of equipment, and therefore it may be advantageous to use as efficiently as possible to improve manufacturing throughput and reduce overhead. Using a servowriter to write every servo wedge 208 of every disc 200 may be slow and inefficient.

Another way to write the servo pattern is via self-servo write (SSW). A drive, such as system 140, employing an SSW process may utilize its embedded controller and its own write heads to write the servo wedges and associated servo sectors 206 to the surface(s) of its constituent disc(s), thus saving cost and time. In order to accurately position the servo patterns on the disc 200, the controller may determine the position of the heads by locking on to a pre-written (e.g., written using a STW) or self-written pattern (e.g., via SSW) on the disc 200 called a spiral pattern 212. The spiral pattern 212 may be written to include a sync mark data pattern that can be used to determine when a spiral 212 is encountered by a read head. Writing the spirals 212 may include moving a write head in a controlled manner (e.g., at a constant velocity) from the outer diameter 202 to the inner diameter 204 (or vice versa) as the disc 200 is spun to create the spiral pattern 212. Although a single spiral pattern 212 is depicted in FIG. 2, a plurality of spirals may be written to the disc 200 at consistent or equidistant intervals. In some embodiments, a single spiral may cross each radial distance of the disc only once, and so it will cross where each track will eventually be written only once. Writing a number of spiral patterns 212 may be a much faster operation to perform with a servowriter than individually writing each servo wedge 208. However, the data storage device must then be able to use the spiral pattern 212 to accurately and precisely write the servo patterns that will define the track locations and ultimately be used during device input and output (I/O) operations.

In some SSW systems, a spiral pattern can be written to a blank disc surface while reading a servo pattern written to the surface of another disc. To generate the requisite spiral write-head trajectory, a seek is conducted during the write operation, which smoothly pushes the write head from the OD 202 to the ID 204. In some circumstances, the servo pattern being read can utilize a single frequency over the entire disc's surface (a single-zone servo pattern), however, a final servo pattern (e.g., the servo pattern on the disc(s) after all SSW processes have completed and the corresponding HDD is ready for host data storage) should include frequency changes at discrete locations along the radius of the disc, a design intended to reduce the overhead associated with the written servo pattern. If a single-zone servo pattern is employed, it is straightforward to read this servo pattern while writing the spiral pattern, with the spiral (write) clock locked to servo (read) clock. This approach, however, cannot be used for an HDD employing multi-zoned servo. The difficulty encountered is that the servo clock must change frequencies at the servo zone boundaries and, as such, a spiral (write) clock (which has a constant frequency from OD to ID) locked to the utilized servo clock would incur large phase excursions at these boundaries. This would inexorably corrupt the written spiral pattern and, thus, precludes the use of such a method in this context.

However, herein disclosed are methods and systems that allow for a spiral to be written in a manner synchronous to the media when a zoned servo pattern is used for head positioning. The disclosed methodology includes synchronizing the servo clocks to the spiral writing clock (e.g., use the spiral clock as the reference clock).

In addition, there are other solutions to perform an SSW; however, as detailed below, these solutions encounter problems and difficulties. For example, in a forward synchronization system, a method for locking two clocks of different frequencies can be utilized. An example of such is provided in co-owned U.S. Pat. No. 10,936,003, entitled "Phase Locking Multiple Clocks of Different Frequencies", issued on Mar. 2, 2021, to Wu et al. A forward synchronization method can have a write clock generated by a spiral clock that can be synchronized to a read clock generated by a servo clock. The synchronization procedure can be conducted by a synchronization block which downsamples the applied clocks by factors N and M, respectively, to generate two clocks that are of equivalent frequencies. These, equal-rate, clocks can be applied to a phase-error detector circuit to generate a signal indicating the relative relationship of the timing of their edges. This signal can then be lowpass filtered and used to drive the adjustment of a digital-to-phase converter (DPC) to shift the phase of the write clock to achieve alignment with the read clock. With the phase locking of the two downsampled clocks as well as some digital circuits to reset the counters, modulo counters using the two clocks should align at specific counter values as well at the end of procedure. This process acts to synchronize the write clock to the read clock.

There is an implied direction of this synchronization process, as adjustments are made (though use of a DPC) to the write clock to follow the edges of the read clock. In the procedure detailed above, the read clock is also being used to demodulate servo sectors written to the disc and generate timestamps for their constituent servo timing mark (STM) fields. The difference of these timestamps with desired timestamp values are used to drive the operation of a disc-locked clock (DLC), which locks the read clock to the surface of the disc. The operation of synchronizing the write clock to the read clock, then, has the effect of transitively locking the write clock to features on the disc's surface as well.

However, the method of transitively locking the write clock to the surface of the disc by locking it to a read clock that is already locked to the disc's surface causes some difficulties. As described above, the change in the read (servo) clock frequency required as servo zone boundaries are crossed causes the change of read clock, thus the read clock loses phase synchronization with the disc's surface. As a result, the write clock loses the lock to the read clock and loses synchronization to the disc. A method to obviate this difficulty is to utilize a two-step process for writing spirals. In the first step, a surface is written with a single-zoned servo pattern, which is used for the seek operation while writing the spiral pattern. In this case, the servo frequency never changes during the seek operation and, thus, the write clock can maintain lock with the disc's surface by locking it to the read (servo) clock. After spirals have been written, the second step is to re-write the single-zoned servo surface written with a multi-zoned servo pattern. Although this procedure is effective in practice, it also incurs additional test-time through use of multiple steps. As an increased manufacturing test-time directly leads to an increase in the cost of production, this solution is not desirable.

Another proposed solution to this problem is to generate timestamps for the STMs using the spiral clock rather than the servo clock used to demodulate the written servo pattern. As the spiral clock does not change frequency over the duration of a seek operation, this would appear to be a viable solution. The operation, however, of generating a timestamp on the spiral clock for the location of a timing mark written and processed at a different frequency (the servo clock data-rate) is difficult to implement. One possibility is to latch the event asynchronously across clock domains; however, this would create uncertainty in the timestamps which has been shown to degrade the spiral quality. Another possibility is to process the servo sector using the spiral clock in an attempt to generate timestamps that do not have uncertainty. The implementation of this approach, however, is very complex as it requires the addition of hardware to process signals read at sampling rates that do not match the written baud rate.

Due to the difficulties and problems of these other solutions, herein is another solution that addresses the problems encountered when writing a spiral pattern synchronously to a disc while conducting a seek using a multi-zoned servo pattern.

Figure 3:
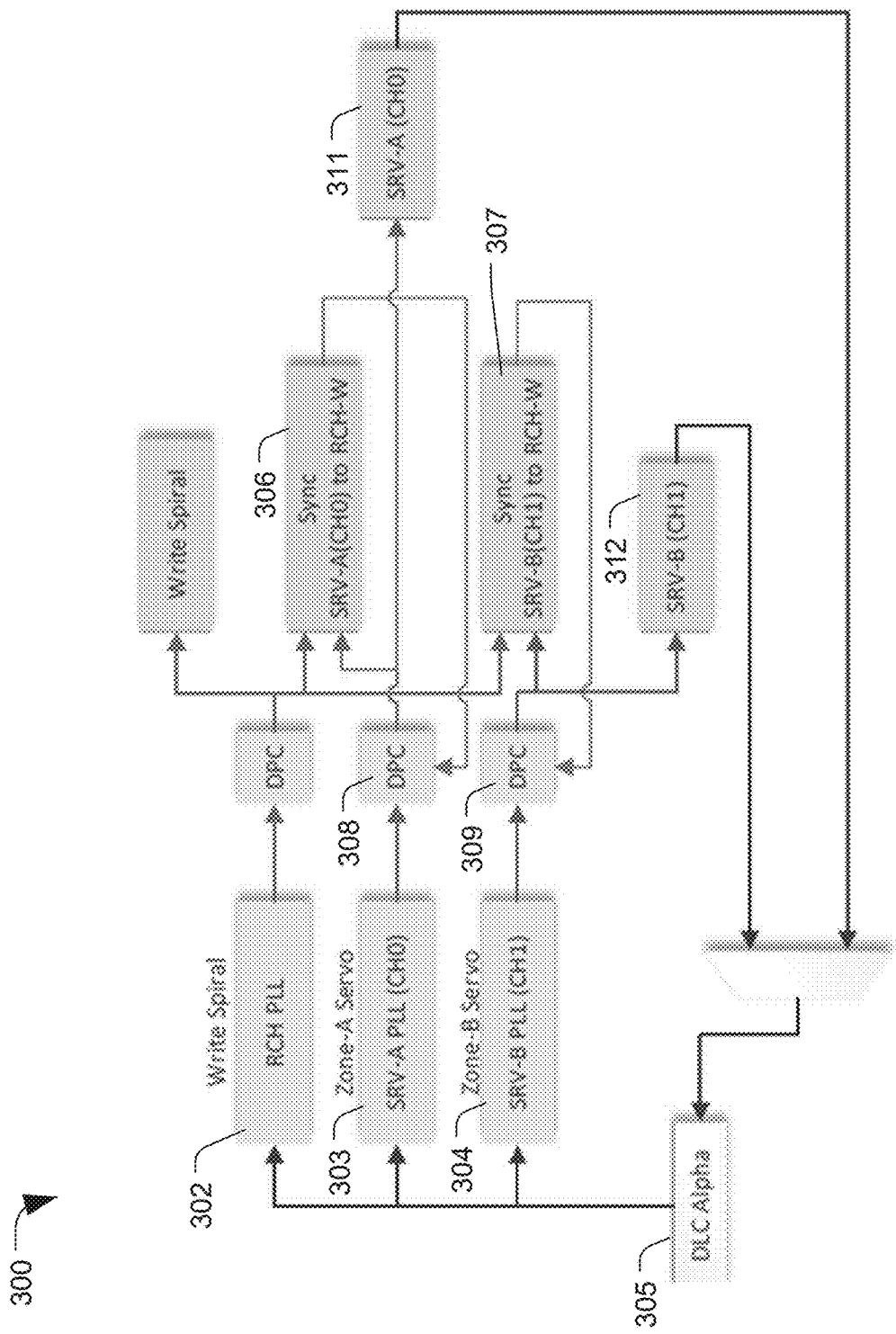
FIG. 3 is a diagram of a control system implementing a phase locked clock, in accordance with certain embodiments of the present disclosure.

FIG. 3 shows a diagram of a control system 300 implementing a phase locked clock, in accordance with certain embodiments of the present disclosure. Control system 300 can be implemented as discrete circuits, programmable logic, software (e.g., firmware), or any combination thereof. The control system 300 can be utilized for locking two clocks of different frequencies and synchronizing the servo clocks to the spiral writing clock. The processes and systems disclosed herein address the problem of writing a spiral pattern synchronously to a disc while conducting a seek using a multi-zoned servo pattern, and such processes and systems take an approach that obviates the inherent complications associated with existing methodologies.

The newly disclosed processes(es) and system(s), such as depicted in FIG. 3, can include:

two servo clocks 303 and 304, where one can be programmed to the servo frequency ($F_A$) in the current servo zone (e.g., SRV-A) and the other can be programmed to the servo frequency ($F_B$) in the next servo zone (e.g., SRV-B;

the servo zone that will be entered when the next servo zone boundary is crossed);

the servo clock 303 programmed to $F_A$ can be used by a servo channel to demodulate servo sectors and generate servo timing mark (STM) timestamps and their associated errors from desired timestamp targets to drive the operation of the DLC; the DLC control 305 (e.g., DLC alpha) can modulate the frequency of the spiral clock 302 (RCH PLL) and both servo clocks 303 and 304 (SRV-A PLL and SRV-B PLL);

a "Sync SRV to RCH" block 306 can synchronize the servo clock to the spiral clock through modification of its associated digital-to-phase converter (DPC) 308;

Note that the servo clock 303 can be synchronized to the spiral clock by this operation, however, the DLC operation can be driving the servo clock (and spiral clock) to be locked to the disc; as such, the spiral clock is also locked to the disc by this operation;

before the servo zone boundary is crossed, the servo clock 304 programmed to $F_B$ can also be locked to the spiral clock 302 through use of a "Sync SRV to RCH block" 307;

when the overlap region is reached (a region in which there are servo sectors from the current and the next servo zone) the servo clock 304 programmed to $F_B$ can be used by the other servo channel to demodulate its servo sectors and generate STM timestamps. Errors that can be used to drive the DLC can be computed from the generated timestamps and desired timestamp target values, where the target timestamps can be selected to maintain phase coherency across servo zone boundaries. An example method for producing target timestamps is outlined below.

after the servo zone boundary is crossed, control of the DLC can be passed to the other servo channel and the operation can be repeated, alternating between servo channels and clocks at each subsequent servo zone boundary crossing.

These systems and processes can synchronize the servo clocks 303 and 304 to the spiral writing clock 302 to use the spiral clock as a reference clock. This may be referred to as "backward synchronization". As shown in FIG. 3, two synchronization blocks 306 and 307 (Sync SRV to RCH) can be added to synchronize the servo clocks 303 and 304 (CH0 and CH1) to the RCH write clock 302. The two synchronization blocks 306 and 307 can be independent of each other and can be used concurrently since they only act to adjust the phase of their own clocks.

Each of the servo clocks 303 and 304 can be applied to a servo channel for demodulation of servo sectors and generation of STM timestamps (e.g., servo channel SRV-A (CH0) can be used to demodulate servo sectors in zone A). Because the servo clock 303 is synchronized to spiral clock 302, its DPC 308 can be adjusted to change the phase of the SRV-A clock 311. The synchronized servo clock 311 (with DPC adjustments), not the free-running servo clock 303 (without the DPC adjustment), can be fed into the servo channel to generate the timestamps on STMs. Since the synchronized servo clock 311 is phase locked to the spiral clock 302, the timestamps can reflect the phase relationship of the STMs on the media to the synchronized servo clock 311, as well as that to the spiral clock 302. The timing error generated by these timestamps can be used to close the DLC loop through control of DLC alpha 305. Since the DLC feedback can be applied to both the servo PLLs 303 and 304 and the RCH PLL 302, any major correction of clock frequency and phase can be applied to all clocks. The timing error, in fact, is based on the phase of the spiral clock 302 (RCH PLL) through such a locking process. Therefore, the spiral clock can be locked to the media (STMs) indirectly through the DLC loop of the servo clock 311, while the servo clock 311 maintains synchronization to the spiral clock 302.

The synchronization of the servo clock to the reference clock can be based on the phase difference between the downsampled clocks of the reference (write) and servo clock (such as was demonstrated in U.S. Pat. No. 10,936,003, entitled "Phase Locking Multiple Clocks of Different Frequencies", issued on Mar. 2, 2021, to Wu et al.). For example, the first synchronization circuit 306 can be configured to adjust the first DPC 308 based on differences in clock edges of the reference clock 302 to the first servo clock 303; and the second synchronization circuit 307 can be configured to adjust the second DPC 309 based on differences in clock edges of the reference clock 302 to the second servo clock 304. Further, the timing marks from each servo channel can be used for a respective DLC loop control, such that the servo timestamps are used to lock the servo clocks (and, transitively, the write clock) to a disc. Thus, the full lock of the reference clock 302 to the media can depend on the synchronization between servo and reference clocks, and the common control of a DLC based on the servo timing marks.

Figure 4:
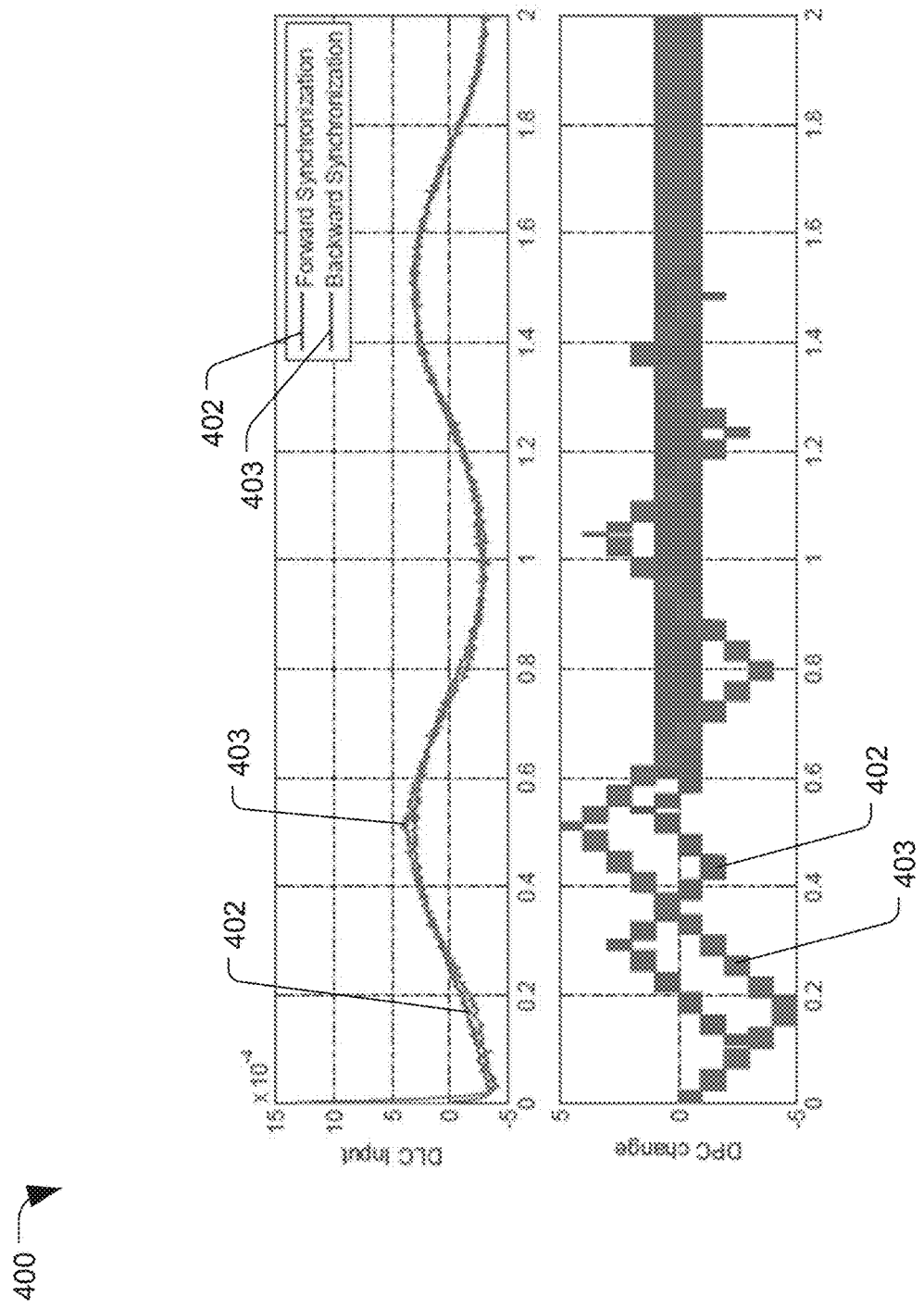
FIG. 4 is a chart showing signals of a phase locked clock system, in accordance with certain embodiments of the present disclosure.

Referring to FIG. 4, a chart showing signals of a phase locked clock system is shown and generally designated 400, in accordance with certain embodiments of the present disclosure. Chart 400 shows the trajectories of a DLC frequency modifier (alpha), labeled DLC input, in the upper plot, and the synchronization loop DPC changes (the lower plot) for both forward clock synchronization 402 and backward clock synchronization 403 as simulated during DLC convergence. The x-axis is the time with unit one revolution. In the example provided, two clocks are shown, programmed to the spiral clock and servo clock frequencies, with the same STM positions (with a sine type of change around a revolution) and other initial conditions. As shown, both methods are able to converge the DLC loop and the synchronization loop. In the forward synchronization scheme, as discussed above, the DLC loop is independent of the synchronization procedure. In the backward synchronization scheme, however, the locking procedure is inside of the DLC operation and, thus, it does affect the DLC loop. As can be seen, this causes the DLC loop and the synchronization loop to interact before finally settling. This, clearly, causes the convergence time for the backward synchronization scheme to be longer than for forward synchronization, though the two schemes are similar in steady state.

Figure 5:
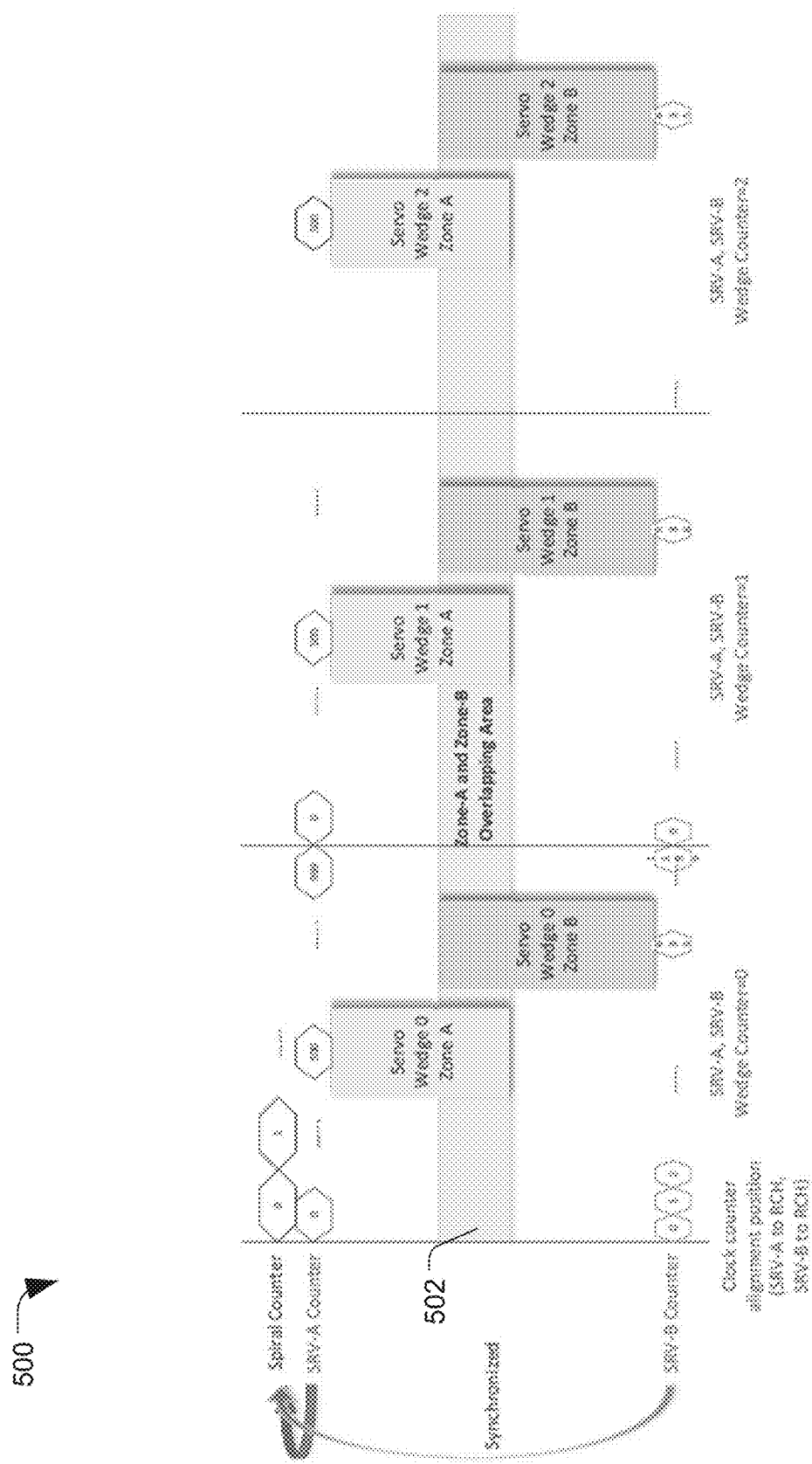
FIG. 5 is a diagram of a phase locked clock calibration system, in accordance with certain embodiments of the present disclosure.

Referring to FIG. 5, a diagram of a phase locked clock calibration system is shown and generally designated 500, in accordance with certain embodiments of the present disclosure. FIG. 5 illustrates an example servo system that may be located on a disc surface. In some embodiments, a process can achieve a phase locked clock via zone switching using two servo channels, such as switching from servo pattern of zone A to zone B, which are of different frequencies. In general, the servo patterns in the two zones can have the same number of wedges around a track; however, the servo sector locations will be shifted on the disc, as illustrated in FIG. 5. This can be done to allow for an overlapping region 502, in which servo wedges exist for both zone A and zone B. This overlapping area 502 allows calibration of the relative phase relationship between the servo STMs in zone A and zone B, which results in a smooth switch of zone A to zone B while maintaining phase coherency. In the following discussion, details are provided for the phase calibration procedure for zone B and the method for switching zones using the two servo channels.

The procedure can start in servo zone A, in which servo channel/clock SRV-A (CH0) is used for reading servo and SRV-A clock is already synchronized to the spiral clock (through the backward synchronization). The servo channel/clock SRV-B (CH1) can then be programmed to the parameters of zone B and also the SRV-B clock can be synchronized to the spiral clock. Note that this operation has no effect on SRV-A clock or the spiral clock. The DPC in SRV-B begins adjustment until SRV-B clock is also synchronized to the spiral clock. At this moment, both the SRV-A clock and the SRV-B clock are synchronized to the spiral clock and, therefore, the SRV-A and the SRV-B clocks are, indirectly, phase locked to each other.

While the clocks are locked, the head can be moved to the overlapping area of zone A servo and zone B servo such that calibration may occur. The goal is to calibrate the targeted timestamp position of zone B when reading and locking to the zone A timestamps. FIG. 5 shows an illustration of this, where the spiral counter and servo counters represent the phases of their respective clocks. When SRV-A and SRV-B clocks are both synchronized to the spiral clock, the SRV-A and SRV-B counter values have a fixed mapping to the spiral counter values. As depicted, the counters at some values are always aligned: both SRV-A and SRV-B counters have their wedge 0 and cycle 0 aligned to the spiral counter 0 (as a simplification, the spiral wedge counter is not shown); because SRV-A and SRV-B have integer number of cycles each wedge (e.g., 1000 and 1200 as shown, respectively), their cycle counter will align at 0 for each wedge. In zone A, the DLC loop can be run where the timing errors are computed as the difference between a timestamp target and the generated timestamps. When the servo clock is phase locked to the disc, the average timing error will be zero for zone A. In FIG. 5, for simplicity, the STMs are plotted in zone A to be aligned (locked) with the timestamp target for zone A, which is at cycle counter 500 every wedge. Because zone B has a different frequency, and because the STMs in zone B are shifted from the zone A STM positions, the same timestamp target from zone A (e.g., 500) cannot be used. When the head is in the overlapping area of zone A and zone B, the servo channel/clock SRV-A (CH0) can be used to read the servo pattern in zone A, while the servo channel/clock SRV-B (CH1) can be used to read the servo pattern in zone B. The DLC loop is still operating using the zone A STM timestamps, while the SRV-B (CH1) is only reading the zone B servo sectors and generating STM timestamps. For example, as shown in FIG. 5, the timestamps read back from zone B wedges 0, 1 and 2 can be 635, 636, and 635, respectively (e.g., with some noise included). If the shift between the servo pattern of zone A and zone B is the same for every wedge, the entire revolution can be read several times to get enough timestamps from every wedge to calculate an average. By averaging the observed zone B timestamps, a calibrated timestamp target for zone B can be obtained. This timestamp target represents the position the STMs in zone B are expected to be when the DLC control is switched from zone A to zone B. Through use of the calibrated timestamp target, a consistent phase for the spiral counter/clock relative to the media when making the transition from zone A to zone B can be maintained.

With the timestamp target calibrated, a zone switch with no phase shift of the spiral clock can now be performed. The zone A servo clock (SRV-A) can be synchronized to the spiral clock while the DLC loop is running using the SRV-A (CH0) timestamps. Then, when the DLC converges, the SRV-A clock/counter can be locked to the disc while also being synchronized to the spiral clock/counter. By phase locking the SRV-A clock to the media and aligning the spiral counter and the SRV-A counter to the same counter values as in calibration, the spiral counters and the SRV-A counters can be phase locked to the media at exactly the same position as in calibration. While the head seeks through zone A, this lock will be maintained. When the head moves from zone A to zone B, and the DLC control is switched from SRV-A(CH0) to SRVB (CH1), the system only needs to update the timing error of the DLC control loop input from using timestamps in zone A to using the timestamps in zone B. In particular, assume that the DLC loop timing error in zone A for wedge n can be written as $$TE_{DLC}(n) = TS_A(n) - Tar_A$$

where $Tar_A$ is the timestamp target of zone A and $TS_A(n)$ is the timestamp of zone A at wedge n. In this example, a target that is only associated with the cycle counter is being used, for example, cycle count 500 at every wedge. Thus, in the above equation, the wedge counter value will not be included in the timestamp $TS_A(n)$. Assume that the head is moving from wedge n to wedge n+1 and the DLC timing error input starts to use the SRV-B (CH1) timestamps from zone B servo pattern at wedge n+1, the timing error in zone B can then be calculated as $$TE_{DLC}(n+(TS_B(n+1) - Tar_B) \times f_A/f_B$$

where $Tar_B$ is the timestamp target calibrated earlier in the procedure. In order to keep the same scale of the timing error into the DLC loop, a ratio of data rate of zone A to zone B $f_A/f_B$ is added as a normalization factor in the timing error computation for zone B (e.g., a DLC error of N generated in zone A will affect the DLC operation differently than the same error generated in zone B due to the disparity of frequencies without this normalization). In this way, there is no extra phase shift being introduced to the DLC loop and the spiral clock can maintain locking to the media.

Since it takes some time to synchronize the zone B clock to the spiral clock, zone A should be large enough to allow for synchronization of the SRV-B clock to the spiral clock such that the SRV-B clock is fully synchronized before the zone switch occurs. At the seek rate utilized in SSW, there is usually more than enough time for this synchronization to complete.

Figure 6:
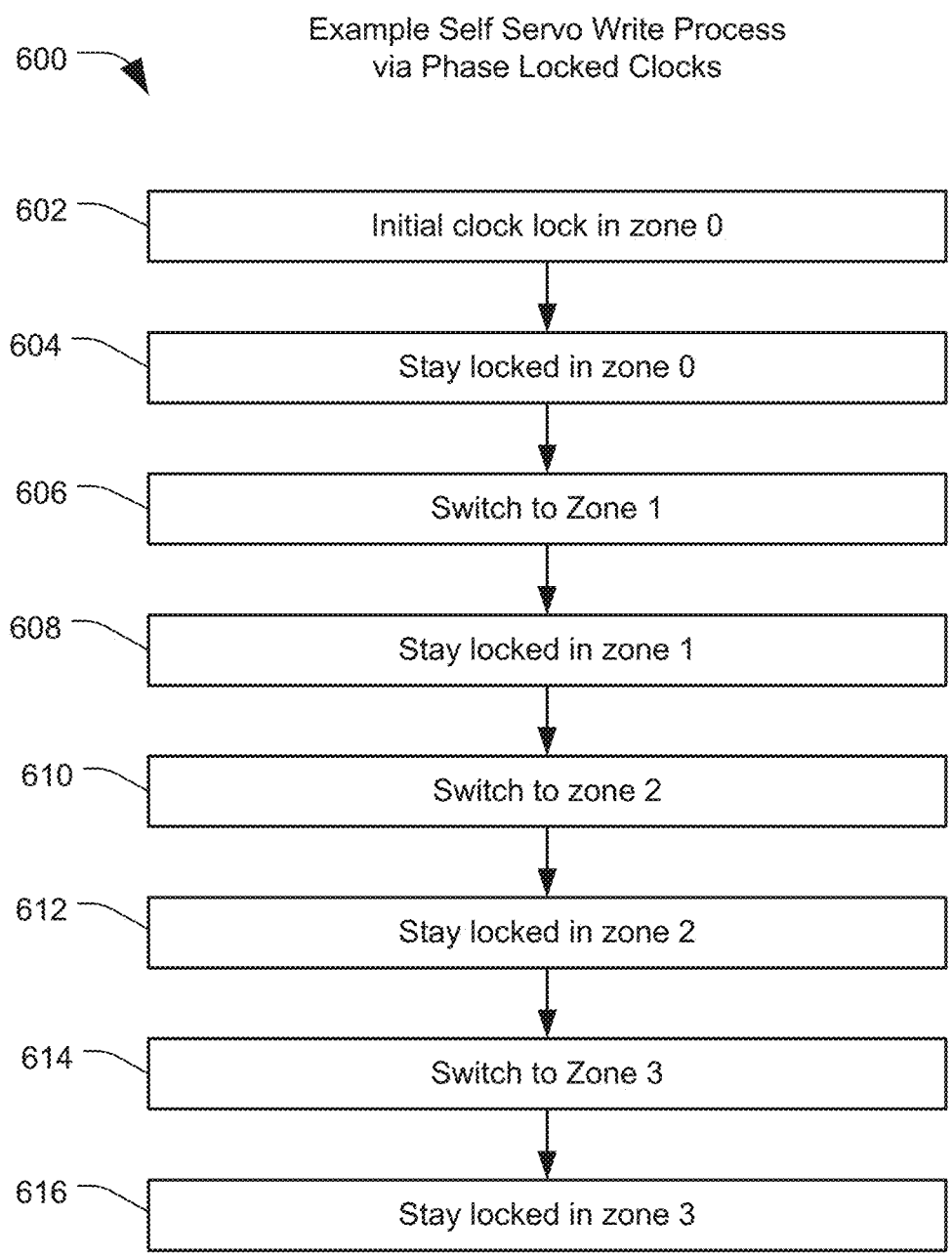
FIG. 6 is a flowchart of a method for a phase locked clock system, in accordance with certain embodiments of the present disclosure.

Referring to FIG. 6, a flowchart of a method for a phase locked clock system is provided and generally designated 600, in accordance with certain embodiments of the present disclosure. Method 600 is an example of implementation of the embodiments discussed above, as applied to a self-servo writing process for writing a spiral pattern on one surface of a disc data storage medium while reading the servo patterns of multiple zones on a different surface.

In some embodiments, the procedure 600 can be considered to have three stages: a calibration stage, a training for repeatable runout (RRO) compensation stage, and a writing of the spiral pattern stage. In the calibration stage, the timestamp targets for each zone can be calibrated at the overlapping area of servo zone boundaries. Once the timestamp targets are calibrated for each zone switch, the procedure 600 can switch zone with no phase uncertainty(e.g., phase shifts). Therefore, the head can seek from OD to ID through different zones while the spiral clock maintains phase lock to the disc. The trajectory of the head seeking can be carefully controlled and repeated. Before actually writing spiral, the firmware can collect RRO compensation information through the same seeking procedure and trajectory to reduce the phase variation during the spiral pattern writing. After the RRO training stage, which may include several seeks from OD to ID at the same locations on the disc, the firmware can write the spiral pattern with the same, albeit RRO compensated, seeking procedure.

In this abbreviated example, a same synchronization/zone switching procedure can be used repeatedly, with some other settings or steps varying. Therefore, such synchronization sequence may be used throughout the writing procedure as the main sequence, and provided below are details of possible implementations in each step for these three stages.

As a specific example, assume that there are four servo zones on a disc data storage medium, here are steps that can be in a synchronization procedure:

Step 1, at 602. Initial clock lock in zone 0: This is a special procedure at the beginning, when nothing is synchronized. After this step, the SRV-A clock can be synchronized to the spiral clock and the synchronized SRV-A (CH0) clock used to run the DLC loop to convergence. Below are some details in this process that can make the initial phase difference between the spiral clock and the servo clock smaller, thus making the synchronization step easier. As an example of a firmware sequence that can implement this step 1, initial lock steps can be as follows:

a. Setup servo channel SRV-A (CH0) to zone 0 parameters, and setup RCH channel for spiral writing. Run a DLC process on SRV-A (CH0) and let it converge.

b. Reset SRV-A wedge counter to align with a servo index mark (SIM) position. For example, reset the counter such that SIM is in wedge 0.

c. Setup the synchronization registers prior to the synchronization procedure. Also, asynchronously reset spiral counters at SIM such that the synchronization alignment positions on both clocks, RCH (spiral write) and SRV-A, are very close. For example, if the synchronization alignment position for both clocks are when their wedge and cycle counters become zero, the RCH wedge counter can be set to 0 at SIM, and the RCH cycle counter can be set to a number (e.g., calculated from servo timestamp target and clock ratio) that would align the zero close to the servo cycle counter 0.

d. Start the synchronization sequence of SRV-A clock to spiral clock. This can include resetting the spiral clock divider at the alignment position, allowing the synchronization PLL to converge and eventually resetting the SRV-A clock counter at the alignment position.

e. Because the synchronization step above is changing the SRV-A DPC, the DLC loop will receive the disturbance away from the converged state. The synchronization loop and DLC loop will eventually converge, thus the spiral clock and the SRV-A clock will be fully locked to the media through how is described above.

Step 2, at 604. Stay locked in zone 0: after step 1, the SRV-A clock should be synchronized to the spiral clock, and DLC loop should be running through SRV-A (CH0) timestamps from zone 0. In this state, now the SRV-B (CH1) servo clock and channel can be turned on to be programmed to the zone 1 servo parameters and then the SRV-B clock can be synchronized to the spiral clock. After SRV-B clock is synchronized to spiral clock, different process can be completed during different stages, for example:

a. Calibration stage: the head can be moved to the overlapping area at the boundary of zone 0 and zone 1 with all three clocks locked. The timestamp target $Tar_1$ for zone 1 can be calibrated using the method described above. After the calibration is done with $Tar_1$ known, the process can go to the next step—switching to zone 1 using $Tar_1$.

b. Stages after calibration: after calibration, the timestamp targets ($Tar_i$, i=0, 1, 2, 3) for all zones are already known. Therefore, the head can perform a normal seek across zone 0. The synchronization of clock SRV-B is done at the same time of head seeking in zone 0. Before the next step (zone switch) or say before the head moves to the zone boundary (the head is seeking continuously), clock SRV-B synchronization can be converged. In practice, there is plenty of time for the clock to synchronize while the head seeks in one servo zone. Every time starting from a random initial condition of the drive and clock phases, the process should be able to lock all the clocks at the same position relative to the media through step 1, which means the movement of the head and the clock phases are well controlled and repeatable. Thus, several of the same seek and train for RRO compensation paths can be repeatedly run. The RRO training and writing of the spiral stages should be exactly the same with settings and head trajectory over the disc, except that during training the spiral write gate is not turned on and RRO information are collected; while in a writing procedure, the spiral write gate is turned on and RRO compensation is used based on the collected RRO information.

Step 3, at 606. Switch to zone 1: in calibration stage, the firmware can choose when to switch zone after $Tar_1$ is obtained. In other stages when the head is seeking across the surface, the time and position for zone switch can be pre-determined. Using the procedure of switching zone as described, in either case, at the end of zone switch, servo channel SRV-B(CH1) is reading the servo pattern in zone 1. The DLC loop control is determined by the CH1 timestamps from the CH0 timestamps and SRV-B clock is synchronized to the spiral clock. Servo clock and channel SRV-A (CH0) are now freed.

Step 4, at 608. Stay locked in zone 1: similarly, as in zone 0, now the SRV-B (CH1) clock is synchronized to the spiral clock, and the DLC loop timing error comes from the timestamps of zone 1 servo pattern through servo channel CH1. The SRV-A (CH0) is now setup for reading zone 2 servo patterns and then synchronized to the spiral clock. The synchronization can be done before the calibration starts in a calibration procedure, or before the next step of zone switch in other procedures, which is the same requirement as step 2. Also similarly, the calibration is to calibrate the timestamp target for zone 2 $Tar_2$ and when that is acquired, the process can switch zones in the next step.

Step 5, at 610. Switch to zone 2: similar to step 3, after the switch SRV-A (CH0) should be reading the zone 2 servo pattern. The DLC loop timing error will be switched to the one generated from servo channel SRV-A (CH0) and the SRV-A clock can be synchronized to the spiral clock. The SRV-B (CH1) servo clock and channel are now freed up.

Step 6, at 612. Stay locked in zone 2: SRV-A (Ch0) can be used for DLC control and SRV-A clock should be synchronized to the spiral clock. During the seeking of the head before zone switch or before the calibration procedure, SRV-B (CH1) can be setup for zone 3 and the clock SRV-B can be synchronized to the spiral clock. At the calibration, the timestamp target $Tar_3$ can be obtained.

Step 7, at 614. Switch to zone 3: the two servo channels, SRV-A (CH0) and SRV-B (CH1), can keep being used alternatively through the zone switch. At this switch, SRV-B (CH1) can be used to obtain the STMs from zone 3 servo patterns and feed them into the DLC loop and the SRV-B clock can also be synchronized to the spiral clock. SRV-A (CH0) is freed up. Typically, this step is not required for the calibration procedure, since all the timestamp targets are already known at this point. Thus, in some embodiments, the calibration stage can stop after step 6.

Step 8, at 616. Stay locked in zone 3: SRV-B (CH1) should be reading the zone 3 servo pattern and synchronized to the spiral clock. After this step, the head can go back to the OD. If another seek is needed, start from step 1 again.

In some embodiments, when multiple spirals are to be written on one surface, the process may only need to do one calibration step. After the calibration, the zone targets can be used for all the writing of the spirals. For each spiral writing though, the process may train RRO separately, and therefore, a synchronization procedure such as this could be used repeatedly.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data channel including a phase lock clock (PLC) module configured to:
   synchronize multiple servo clocks to a reference clock, the multiple servo clocks used to read servo data from servo zones with different frequencies, and the reference clock used to perform a write of a spiral pattern utilizing a single frequency phase; and
   after synchronization of the multiple servo clocks, perform the write to a first data storage medium while a write head is positioned based on the servo zones with different frequencies.

2. The apparatus of claim 1 further comprising the servo zones include a first servo zone having a first frequency and a second servo zone having a second frequency that is different than the first frequency and the PLC module configured to zone switch between the first servo zone and the second servo zone to position the write head.

3. The apparatus of claim 2 further comprising the PLC module including:
   a first servo clock aligned to the first frequency and configured to be utilized by a first servo channel to demodulate the first servo zone and generate first servo timing marks;
   a second servo clock aligned to the second frequency and configured to be utilized by a second servo channel to demodulate the second servo zone and generate second servo timing marks; and
   a disc locked clock (DLC) control circuit configured to maintain phase coherency based on the first servo timing marks and the second servo timing marks when switching from the first servo zone to the second servo zone.

4. The apparatus of claim 3 further comprising the PLC module including:
   a first digital-to-phase converter (DPC) configured to shift the phase of the first servo clock to achieve alignment with the reference clock; and
   a second DPC configured to shift the phase of the second servo clock to achieve alignment with the reference clock.

5. The apparatus of claim 4 further comprising the PLC module including:
   a first synchronization circuit configured to synchronize the first servo clock to the reference clock based on adjustment to the first DPC, the first synchronization circuit configured to adjust the first DPC based on differences in clock edges of the reference clock to the first servo clock;
   a second synchronization circuit configured to synchronize the second servo clock to the reference clock based on adjustment to the second DPC, the second synchronization circuit configured to adjust the second DPC based on differences in clock edges of the reference clock to the second servo clock; and
   the first and second servo timing mark errors are based on target timestamps selected to maintain phase coherency across servo zone boundaries.

6. The apparatus of claim 5 further comprising the PLC module including the DLC control circuit configured to modulate the frequency of the reference clock and both servo clocks based on servo timing mark errors, where, after a servo zone boundary is crossed, control of the DLC control circuit is passed from the first servo channel to the second servo channel and operation of the DLC control circuit is repeated, alternating between the first and second servo channels and first and second servo clocks at each subsequent servo zone boundary crossing.

7. The apparatus of claim 1 further comprising the reference clock is a spiral write clock and the write includes writing a spiral pattern to the first data storage medium via a write element positioned based on the servo zones with different frequencies.

8. The apparatus of claim 7 further comprising the data storage medium includes a magnetic disc.

9. The apparatus of claim 7 further comprising:
the write includes writing the spiral pattern written to the first data storage medium while the servo zones are located on a second data storage medium.

10. The apparatus of claim 9 further comprising the first data storage medium does not contain servo patterns.

11. The apparatus of claim 7 further comprising the write includes writing the spiral pattern during a self-servo write operation.

12. The apparatus of claim 1 further comprising the multiple servo clocks and the reference clock are generated based on one or more phase locked loop (PLL).

13. A phase-locking circuit comprising:
a write clock circuit configured to produce a write clock;
a first servo channel circuit;
a second servo channel circuit;
a first servo clock circuit configured to produce a first read clock aligned to a first frequency and configured to be utilized by the first servo channel circuit to demodulate a first servo zone having the first frequency and generate first servo timing marks;
a second servo clock circuit configured to produce a second read clock aligned to a second frequency and configured to be utilized by the second servo channel circuit to demodulate a second servo zone having the second frequency and generate second servo timing marks;
a disc locked clock (DLC) control circuit configured to maintain phase coherency based on the first servo timing marks and the second servo timing marks when switching from the first servo zone to the second servo zone;
the phase-locking circuit configured to:
synchronize the first servo clock and the second servo clock to the write clock; and
after synchronization of the first and second servo clocks, perform a write to a first data storage medium utilizing a single frequency phase while a write head is positioned based on both the first servo zone and the second servo zone.

14. The circuit of claim 13 further comprising:
a first digital-to-phase converter (DPC) circuit configured to shift the phase of the first servo clock to achieve alignment with the write clock; and
a second DPC circuit configured to shift the phase of the second servo clock to achieve alignment with the write clock.

15. The circuit of claim 14 further comprising:
a first synchronization circuit configured to synchronize the first servo clock to the write clock based on adjustment to the first DPC;
a second synchronization circuit configured to synchronize the second servo clock to the write clock based on adjustment to the second DPC; and
the first and second servo timing mark errors are based on target timestamps selected to maintain phase coherency across servo zone boundaries.

16. The circuit of claim 15 further comprising the DLC control circuit configured to modulate the frequency of the write clock, the first servo clock, and the second servo clock based on servo timing mark errors, where, after a servo zone boundary is crossed, control of the DLC control circuit is passed from the first servo channel to the second servo channel and operation of the DLC control circuit is alternated between the first and second servo channels at each subsequent servo zone boundary crossing.

17. A memory device storing instructions that when executed cause a processing circuit to perform a method comprising:
synchronizing, in a data channel, multiple servo read clocks to a reference clock; and
after synchronization of the multiple servo read clocks, applying the reference clock to perform a write of a spiral pattern to a first data storage medium utilizing a single frequency phase while a write head is positioned based on servo zones with different frequencies.

18. The memory device of claim 17 comprising the method further including:
aligning a first servo clock to a first frequency to be utilized by a first servo channel to demodulate a first servo zone and generate first servo timing marks;
aligning a second servo clock to a second frequency to be utilized by a second servo channel to demodulate a second servo zone and generate second servo timing marks, where the first frequency and second frequency are different; and
maintaining phase coherency based on the first servo timing marks and the second servo timing marks when switching from the first servo zone to the second servo zone.

19. The memory device of claim 18 comprising the method further including:
shifting the phase of the first servo clock to achieve alignment with the reference clock; and
shifting the phase of the second servo clock to achieve alignment with the reference clock.

20. The memory device of claim 19 comprising the method further including:
synchronizing the first servo clock to the reference clock by adjusting the first DPC;
synchronizing the second servo clock to the reference clock by adjusting the second DPC;
where the first and second servo timing mark errors are based on target timestamps selected to maintain phase coherency across servo zone boundaries; and
modulating the frequency of the reference clock, the first servo clock, and the second servo clock based on servo timing mark errors of which servo zone a read element is over.

* * * * *